United States Patent [19]

Atsukawa et al.

[11] 4,282,115

[45] Aug. 4, 1981

[54] CATALYST FOR SELECTIVELY REDUCING NITROGEN OXIDES FROM OXYGEN-CONTAINING EXHAUST GASES

[75] Inventors: Masumi Atsukawa; Yoshihiko Nishimoto; Naruo Yokoyama; Toshikuni Sera, all of Hiroshima, Japan

[73] Assignee: Mitsubishi Jukogyo Kabushiki Kaisha, Tokyo, Japan

[21] Appl. No.: 117,765

[22] Filed: Feb. 1, 1980

Related U.S. Application Data

[63] Continuation-in-part of Ser. No. 66,546, Aug. 14, 1979, abandoned, which is a continuation of Ser. No. 836,961, Sep. 27, 1977, Pat. No. 4,186,109.

[30] Foreign Application Priority Data

Sep. 30, 1976 [JP] Japan ............................... 51-117424
Feb. 18, 1977 [JP] Japan ................................. 52-16874

[51] Int. Cl.³ ..................... B01J 21/06; B01J 23/02; B01J 23/72; B01J 23/74

[52] U.S. Cl. .................................. 252/440; 252/456; 252/457; 252/459; 252/477 R; 423/213.2; 423/213.5; 423/239

[58] Field of Search ............... 252/440, 456, 457, 459, 252/477 R; 106/40 R; 423/213.5, 239, 239 A; 428/116

[56] References Cited

U.S. PATENT DOCUMENTS

| 3,112,184 | 11/1963 | Hollenbach ...................... 428/116 X |
| 3,939,104 | 2/1976 | Campbell et al. ............... 252/457 X |
| 3,960,510 | 6/1976 | Sergeys ........................... 252/477 R |

*Primary Examiner*—W. J. Shine

[57] ABSTRACT

A catalyst for the selective catalytic reduction of nitrogen oxides by the use of ammonia as a reducing agent composed of a catalytically active constituent on a carrier having a honeycomb or parallel plate structure, the carrier being prepared from a slurry of crystallized calcium silicate prepared by mixing silicic acid and lime and heating the mixture under pressure, the calcium silicate having the structure of xonotrite and the formula 6 $CaO.6\ SiO_2.H_2O$.

6 Claims, 3 Drawing Figures

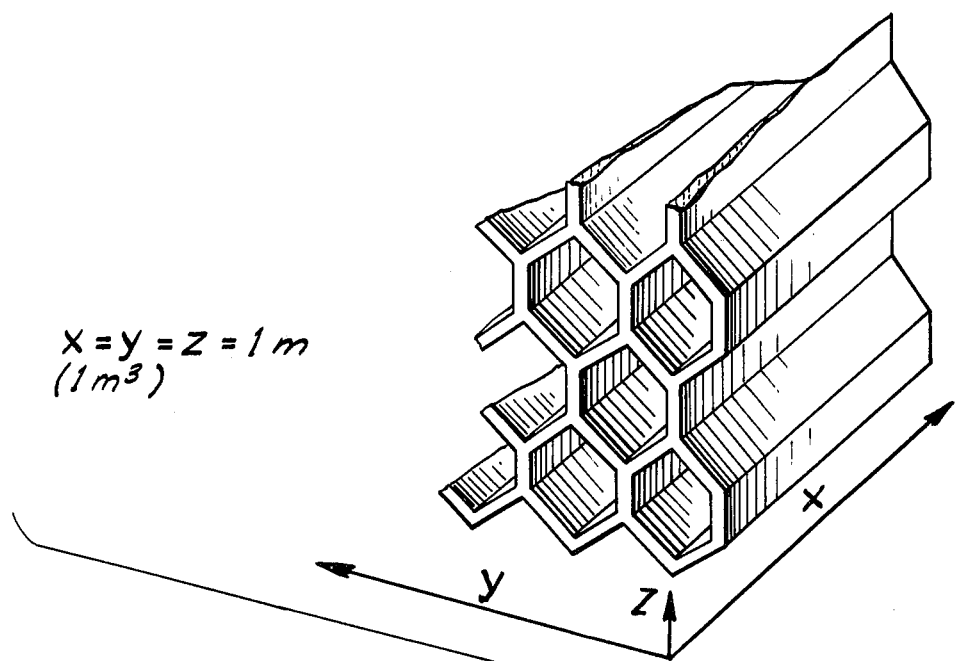
FIG.1a
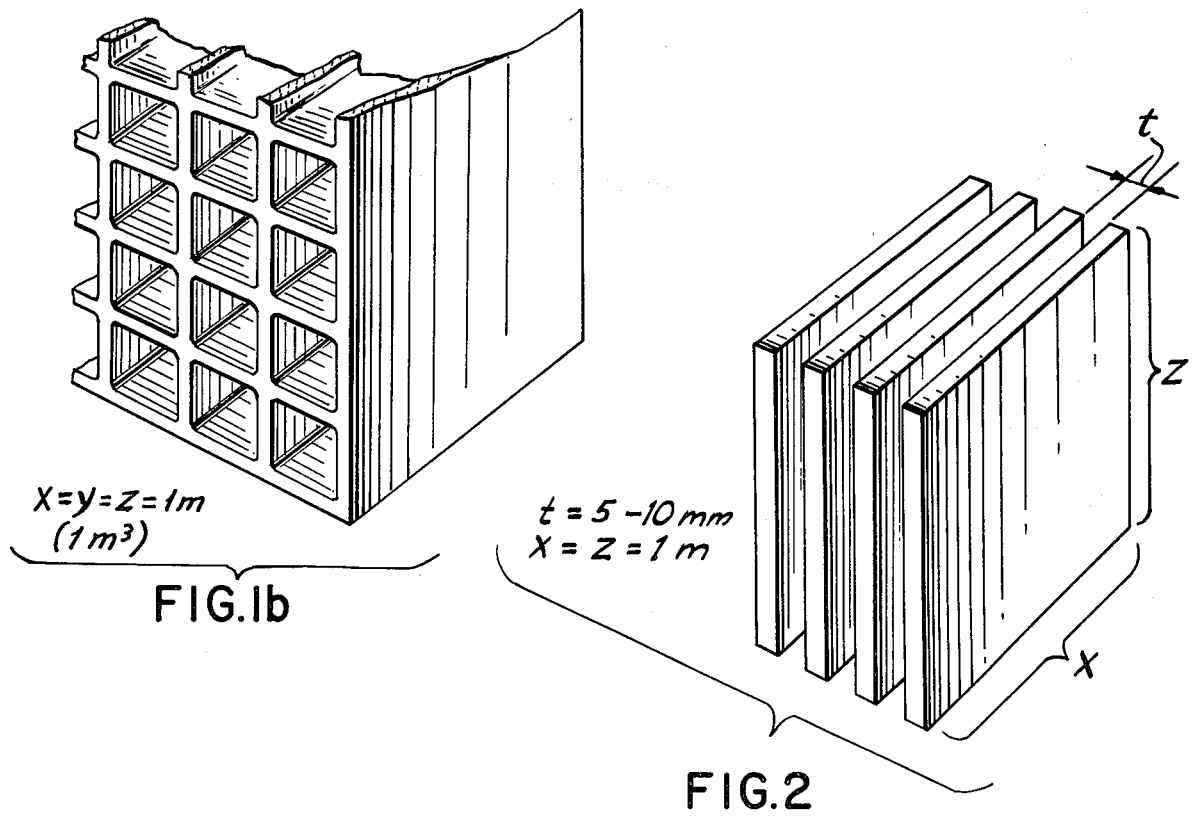
FIG.1b
FIG.2

CATALYST FOR SELECTIVELY REDUCING NITROGEN OXIDES FROM OXYGEN-CONTAINING EXHAUST GASES

CROSS-REFERENCE TO RELATED APPLICATIONS

This application is a continuation-in-part of application Ser. No. 66,546, filed on Aug. 14, 1979, now abandoned, which, in turn, is a continuation of application Ser. No. 836, 961, filed on Sept. 27, 1977, now U.S. Pat. No. 4,186,109, the contents of each prior application being incorporated herein by reference.

BACKGROUND OF THE INVENTION

1. Field of the Invention

This invention relates to a catalyst for effectively and economically reducing to innocuous forms the nitric oxide (NO), nitrogen dioxide ($NO_2$) and the like (hereinafter referred to collectively as nitrogen oxides or NOx) contained in exhaust gases from oil- and coal-fired boilers, combustion furnaces associated with various chemical plants, iron foundries, and internal combustion engines, such as, diesel engines and turbines.

More particularly, the invention concerns a catalyst which, when exposed to so-called "dirty" exhaust gases containing in addition to NOx, sulfur oxides (SOx), soot and dust which tend to poison ordinary catalysts, converts the NOx into harmless $N_2$ and $H_2O$ by catalytic reduction with the aid of ammonia ($NH_3$) used as a reducing agent, the catalyst performing its action efficiently without being affected by the otherwise toxic ingredients, and at low cost without the danger of secondary pollution.

2. Description of the Prior Art

Removal of NOx from waste gases is carried out in a variety of ways; for example, by solidification and collection, adsorption, oxidation and absorption, and reduction. The reduction process is further divided into wet and dry processes. In the solidification and adsorption processes, concentrated NOx have to be treated in some way or other. The adsorption and wet reduction require at added process cost an oxidizing agent because of the stability of NO. Moreover, the adsorption and absorption necessitate large size equipment and involve difficulties in the regeneration of the adsorbent and absorbent, disposal of secondary products, and abation of secondary pollution with the waste liquids. Thus, with the exception of dry reduction, all processes proposed so far have problems to be solved before they are successfully put to practical use.

The dry process reduction, which reduces NOx to harmless $N_2$ and $H_2O$ by a reducing gas mixture containing $NH_3$, $H_2$, $H_2S$, CO, HC and the like, poses none of the above-mentioned problems and is therefore under development in many segments of industry. One way of accomplishing dry reduction is to effect the reaction of NOx with $NH_3$ in the reducing gas mixture in the absence of any catalyst at elevated temperature. Disadvantages of this method are the high and limited effective temperature range, large quantities of reducing gases to be discharged, and the necessity of a large reducing gas volume, several times as much as the NOx to be made harmless.

Another method depends on a catalytic reduction reaction with a catalyst for the transformation of NOx into innocuous forms (the process being hereinafter called "denitrification"). The method is classified into two types according to the type of the reducing agent chosen. Of these, the selective catalytic reduction which is not influenced by the presence or absence of $O_2$ in the exhaust gases to be handled, is believed economically advantageous because the reaction proceeds at a relatively low temperature and with the same amount of a reducing agent as the NOx.

It is an object of the present invention to provide a catalyst useful in the reaction of NOx together with the reducing agent $NH_3$.

Catalysts for the selective catalytic reduction process are generally known to be effective when comprising: a carrier which may be alumina, titania, zirconia, silica, their mixture, or one of porous substances, such as, diatom earth and zeolite, used either singly or in combination; and a catalytically active ingredient to be chosen from among the oxides and sulfates of transition elements of base metals as well as precious metals. Alumina type carriers are susceptible to the poisoning effects of SOx, and therefore, they may shorten the catalyst life and may sometimes prove uneconomical in treating a large volume of exhaust gases.

Generally, SOx-containing combustion waste gases also contain soot and dust. For these so-called "dirty" gases, the reactors packed with ordinary granular catalysts are of no use because the dust chokes the catalyst bed as the gases pass through it. Of the transition elements of base metals, harmful heavy metal elements, such as, chromium, when incorporated into catalysts, might come off from the supports and cause a problem of secondary environmental pollution.

Attempts to solve these problems have been made. To combat the poisoning by sulfur oxides, durable carriers of titania, zirconia, and the like have been employed. Against the choking effect of the dust, moving-bed reactors in which the granular catalysts are made movable, and catalysts of special shapes, such as, honeycombs and hollow cylinders, have been introduced.

However, there are a number of disadvantages. The material cost of titania and the like is high. The specific gravities of the catalysts are so heavy that the reactors must be reinforced with additional support frames. Complexity in design calls for special technical skill in building the moving-bed reactors. Site limitations render it difficult to add the denitrifying equipment to existing installations. Furthermore, titania and zirconia do not lend themselves readily to forming or molding to desired shapes.

Particularly, because of the relatively large amounts of soot and dust in these gases, e.g., those produced from the combustion of bottom oil and coal as opposed to natural gas or kerosene, clogging of the catalysts can best be avoided by having the carrier be in a form, e.g., sheets, parallel plates, such that the gas contacts the catalyst in a manner so that the particulate soot and dust will not impinge upon and clog the pores of the carrier. It is thus important that the carrier be susceptible to forming into the desired shape and have sufficient strength to maintain the shape during handling and use.

SUMMARY OF THE INVENTION

In view of the foregoing, another object of the invention is to provide a lightweight, inexpensive catalyst which is freely moldable for any applications intended, resistant to the poisonous constituents of gases to be handled, and can be regenerated with ease.

This is accomplished by using as a catalyst, a catalytically active constituent on a carrier having a honeycomb or parallel plate structure which is prepared from a slurry of crystallized calcium silicate prepared by mixing silicic acid and lime and heating the mixture under pressure. The calcium silicate has the crystal structure of xonotrite with the chemical formula $6CaO.6SiO_2.H_2O$ and a catalytically active constituent on said carrier.

The use of this particular material as the carrier is important since it can be formed or compressed into the desired shapes of the appropriate size, e.g., plates of 1 m $\times$ 1 m $\times$ 10 mm or a honeycomb of 1 m $\times$ 1 m $\times$ 1 m.

Additionally, the catalyst of the present invention can be used to treat exhaust gases containing NOx concentrations as low as 200 to 250 ppm and also control the oxidation of SOx as well.

Because of the versatility in forming, the catalyst according to the invention may, of course, be available in the form of thin plates which are light in weight with the specific gravity ranging from 0.2 to 0.5. The catalyst of the invention in plate form may be held inside the existing flues so that the gases can be brought into parallel contact with such catalyst plates and the NOx contents can be made harmless with the aid of $NH_3$ as the reducing agent. Under the invention, therefore, no special denitrifying equipment is required, installation cost is materially saved, and air pollution is avoided without difficulty. In addition, the flow of gases in parallel with the sheets of catalyst during the catalytic reduction eliminates the possibility of dust depositing on or clogging the catalyst beds, moving or fixed, as in conventional reactors. Thus, with no reduction in activity due to choking, the catalyst of the invention has long life and permits the denitrifying equipment to be built and maintained at extremely low cost.

BRIEF DESCRIPTION OF THE DRAWING

FIGS. 1a and b show honeycomb structured catalysts of the present invention.

FIG. 2 shows a parallel plate catalyst of the present invention.

DESCRIPTION OF THE PREFERRED EMBODIMENT

In order to realize the above objects, we have carried on extensive researches concerning a denitrifying catalyst. Our aim has been to obtain a novel catalyst which is highly active, durable, unusually resistant to the poisoning attack of sulfur oxides, lightweight, moldable with ease to any desired shape, and capable of reducing the cost, including the material and manufacturing expenses of the catalyst. As a result, it has now been found that a catalyst with extremely desirable properties can be obtained on the basis of crystalline calcium silicate which is prepared by suspending a silicic acid material and a lime material in water, and effecting and promoting a hydrothermal synthesizing reaction and crystallization of the mixture with the application of pressure and heat and either with continuous or intermittent agitation or with discontinuation of agitation somewhere midway the process. In practice of the invention, the silicic acid material and the lime material may be any suitable ones in common use.

The crystallized calcium silicate used as the carrier of the present invention has the crystal structure of xonotrite and the formula $6CaO.6SiO_2.H_2O$.

Articles made of the calcium silicate crystals that forms the basis of the catalyst of this invention are described in Japanese Patent Publication No. 25771/70 (published Aug. 26, 1970). According to the prior publication, the moldings possess not only the advantages of the conventional calcium silicate ones, that is, the lightness, great strength, excellent refractoriness, and good heat insulation, but additional advantages of moldability to desired shapes and considerably low cost made possible by the omission of the pressure steaming of the green moldings, a step essential for prior art processes. With these advantages the silicate calcium crystal articles have found extensive and large tonnage applications as heat insulators and interior materials in the building trade. We have now found that an excellent catalyst is obtained by using the calcium silicate molding endowed with those desirable properties as the carrier of a denitrifying catalyst and allowing the carrier to carry a catalytic constituent effective for the selective reduction of nitrogen oxides using $NH_3$ as a reducing agent.

It has been reported that useful denitrifying catalysts are made of oxides of V and Mo (West German Pat. No. 1253684 (patented Jan. 22, 1963) and W, V and Mo (U.S. Pat. No. 3,279,884). Sulfates of various transition elements of base metals are also reported to be effective (Japanese Patent Application Disclosure No. 80960/75).

The known denitrifying catalysts consist of one of the above-mentioned catalytically active constituents carried by a support of porous refractory substance, such as $Al_2O_3$, $SiO_2$, $TiO_2$, and $ZrO_2$. Those refractories are usually difficult to mold and, in order to form granules or hollow cylinders, they must be subjected to a rotary or pelletizing process. The possibility of choking with the soot and dust in waste gases makes the reactors packed with a granular catalyst impractical. The catalysts in plate form (e.g., 10 mm thick, one meter wide, and one meter long) are free from the choking effect of the soot and dust. However, the plates are difficult to form, heavy due to the generally high specific gravity of the catalyst and are cumbersome to handle, and render it necessary to design the reactors with sufficient strength to bear the weight of the catalyst. These add to the cost of the prior art catalysts to economic disadvantage.

As compared with the prior art ones, the denitrifying catalyst according to this invention can be easily molded or formed to any desired shapes, and are lightweight (with a specific weight of 0.3 to 0.5 ton/m$^3$), and manufactured at low cost.

The catalytically active constituents suitable for use in the present invention include the oxides and sulfates of iron, copper, vanadium, and combinations thereof. Additionally, in another embodiment of the present invention, the carrier may be pretreated with sulfuric acid or a sulfate in order to neutralize the free CaO therein.

Additionally, the catalytic composition may consist of either $TiO_2$ of the anatase type or $ZrO_2$, $V_2O_5$, and one additional constituent, such as, $MoO_3$, $Co_2O_3$ and $WO_3$ wherein the amounts are 2–5 wt % $V_2O_5$, 1–10 wt % $MoO_3$, $Co_2O_3$ or $WO_3$, and the balance $TiO_2$ or $ZrO_2$. The carrier may also be prepared by adding $ZrO_2$ in amounts such that the carrier contains from 5 to 50% of $ZrO_2$.

In addition to these unmatched features, the catalyst may be further improved in its catalytic action by conversion of the free CaO in the calcium silicate into CaSO₄ or by incorporation of highly effective denitrifying catalysts, such as $TiO_2$, $ZrO_2$, $V_2O_5$, $WO_3$, $Co_2O_3$, and $MoO_3$. These catalytic substances may be carried either singly or in combination by the support. Another advantage of the lightweight catalyst according to the invention is an economy in steel material for the construction of the support frame and other reinforcements of the reactor to be packed with the catalyst.

The invention is illustrated by the following non-limitative examples.

Referring to the drawings, FIGS. 1a and b show two different type of honeycomb catalyst structures with suitable dimensions which can be formed using the carrier of the present invention. Similarly, FIG. 2 shows the plate shaped structure which can also be used with the present invention.

EXAMPLE 1

Fifty-four parts of silica sand powder and 46 parts of quick lime were mixed with 1200 parts of water. The mixture was placed in an autoclave equipped with a stirrer, the vessel was hermetically sealed and the internal pressure was increased to 12 kg/cm² (at a temperature of 191° C.), and a reaction was carried out with stirring at a rate of 100 agitations per minute for five hours. The resulting calcium silicate slurry, with the addition of 10 parts of glass fiber, was formed to plates, each measuring 10 mm thick, 1000 mm wide, and 1000 mm long. The plates were dewatered and allowed to carry 10 wt % of $VOSO_4$ as the catalytically active constituent.

The catalyst plates thus obtained were connected end to end and arranged in parallel at intervals of 14 mm to provide a seven-meter-long catalyst layer in a reactor. In this way the reactor was packed with the catalyst at a rate of the formula $$\frac{\text{Quantity of gases to be treated (Nm}^3/\text{H)}}{\text{Catalyst surface area (m}^2)} = 10$$

and a gaseous mixture of the composition shown in Table 1 leaving an oil-fired boiler (in a quantity of 1000 Nm³/H) was brought into contact with the catalyst in a parallel flow at a temperature of 350° C., $NH_3/NO_x = 10$, and linear velocity of 4 m/sec. This resulted in 41% denitrification of the gaseous mixture.

EXAMPLES 2 THROUGH 7

Six sets of support plates of calcium silicate obtained in accordance with Example 1 were allowed to carry 10 wt % each of $FeSO_4$, $Fe_2(SO_4)_3$, $CuSO_4$, $V_2O_5$, $Fe_2O_3$ and CuO, respectively. The catalysts so obtained were evaluated in the same way as in the preceding example, and results as given in Table 2 were obtained.

TABLE 1

| Constituent | Concentration |
|---|---|
| $NO_x$ | 200–250 ppm |
| $NH_3$ | 200–250 ppm |
| $SO_x$ | 800–1000 ppm |
| $SO_3$ | 20–30 ppm |
| $O_2$ | 3–5% |
| $CO_2$ | 12% |
| $H_2O$ | 8–12% |
| Dust | 70–120 mg/Nm³ |
| $N_2$ | bal. |

TABLE 2

| Example | 2 | 3 | 4 | 5 | 6 | 9 |
|---|---|---|---|---|---|---|
| Carried constituent | $FeSO_4$ | $Fe_2(SO_4)_3$ | $CuSO_4$ | $V_2O_5$ | $Fe_2O_3$ | CuO |
| Denitrification rate (%) | 45 | 40 | 35 | 32 | 43 | 25 |

EXAMPLES 8 TO 11

Calcium silicate plates prepared in accordance with Example 1 were immersed in a 10% $H_2SO_4$ solution for 15 minutes and dried. The carriers were allowed to carry 10 wt % each of $VOSO_4$, $FeSO_4$, $Fe_2(SO_4)_3$ and $CuSO_4$, respectively. The resulting catalysts were evaluated in the same manner as in Example 1. Table 3 shows the results.

TABLE 3

| Example | 8 | 9 | 10 | 11 |
|---|---|---|---|---|
| Carried constituent | $VOSO_4$ | $FeSO_4$ | $Fe_2(SO_4)_3$ | $CuSO_4$ |
| Denitrification rate (%) | 82 | 78 | 73 | 69 |

EXAMPLES 12 TO 14

The catalyst according to Example 5 is highly reactive for oxidation, converting $SO_2$ into $SO_3$ simultaneously with the denitrifying reaction, and it combines with the $NH_3$ used as the reducing agent to form a compound which, in turn, will corrode the rear stage parts of the denitrifying equipment. With the view to inhibiting this $SO_2$ conversion, three sets of calcium silicate plates obtained in accordance with Example 1 were allowed to carry, respectively, 2 wt % $V_2O_5$ and 8 wt % $MoO_3$, 2 wt % $V_2O_5$ and 8 wt % $Co_2O_3$, and 2 wt % $V_2O_5$ and 8 wt % $WO_3$, to form catalysts. These catalysts were evaluated in the manner described in Example 1. The results are given in Table 4.

TABLE 4

| Example | 12 | 13 | 14 |
|---|---|---|---|
| Carried constituent | $V_2O_5$ $MoO_3$ | $V_2O_5$ $Co_2O_3$ | $V_2O_5$ $WO_3$ |
| Denitrifying rate (%) | 32 | 30 | 32 |

The rates of conversion from $SO_2$ to $SO_3$ were calculated for these catalysts, together with the catalyst of Example 5, and the results as given in Table 5 were obtained.

TABLE 5

| Example | 5 | 12 | 13 | 14 |
|---|---|---|---|---|
| $SO_2$ oxidation rate* (%) | 12.5 | 4.0 | 6.5 | 2.5 |

*$SO_2$ oxidation rate (%) = $\frac{\text{Outlet } SO_3 \text{ conc.} - \text{Inlet } SO_3 \text{ conc.}}{\text{Inlet } SO_2 \text{ conc.}} \times 100$

EXAMPLES 15 TO 17

With addition of $ZrO_2$, a calcium silicate slurry obtained in accordance with Example 1 was formed to plates containing 10 wt % of $ZrO_2$. The carriers in the form of plates were allowed to carry 10 wt % each of $V_2O_5$, $Fe_2O_3$ and $MoO_3$, respectively. The catalysts thus prepared were evaluated in the same way as in Example 1. The results as shown in Table 6 were obtained.

TABLE 6

| Example | 15 | 16 | 17 |
|---|---|---|---|
| Carried constituent | $V_2O_5$ | $Fe_2O_3$ | $MoO_3$ |
| Denitrification rate (%) | 86 | 78 | 83 |

EXAMPLE 18

Plates of calcium silicate prepared in accordance with Example 1 were allowed to carry a slurry containing 90 wt % $TiO_2$ (of the anatase structure) and 10 wt % $V_2O_5$. The resulting catalyst was evaluated as in Example 1. Table 7 shows the results.

TABLE 7

| Example | 18 |
|---|---|
| Denitrification rate (%) | 90 |
| $SO_2$ oxidation rate (%) | 10.5 |

EXAMPLES 19 TO 24

Plates of calcium silicate formed in accordance with Example 1 were used as carriers. On six sets of the carrier plates were carried different catalytic compositions, i.e., 90 wt % $TiO_2$ (anatase type), 2 wt % $V_2O_5$ and 8 wt % $MoO_3$; 90 wt % $TiO_2$ (anatase type), 2 wt % $V_2O_5$ and 8 wt % $Co_2O_3$; 90 wt % $TiO_2$ (anatase type), 2 wt % $V_2O_5$ and 8 wt % $WO_3$; 90 wt % $ZrO_2$, 2 wt % $V_2O_5$ and 8 wt % $MoO_3$; 90 wt % $ZrO_2$, 2 wt % $V_2O_5$ and 8 wt % $Co_2O_3$; and 90 wt % $ZrO_2$, 2 wt % $V_2O_5$ and 8 wt % $WO_3$. The catalysts thus obtained were evaluated in the same manner as in Example 1. The results are summarized in Table 8.

The catalytic composition accounted for not more than 10% of the weight of the carrier plates. There was no appreciable increase in specific gravity.

TABLE 8

| Example | 19 | 20 | 21 | 22 | 23 | 24 |
|---|---|---|---|---|---|---|
| Carried constituent | $TiO_2$ $V_2O_5$ $MoO_3$ | $TiO_2$ $V_2O_5$ $Co_2O_3$ | $TiO_2$ $V_2O_5$ $WO_3$ | $ZrO_2$ $V_2O_5$ $MoO_3$ | $ZrO_2$ $V_2O_5$ $Co_2O_3$ | $ZrO_2$ $V_2O_5$ $WO_3$ |
| Denitrification rate (%) | 93 | 90 | 95 | 91 | 87 | 93 |

The $SO_2$ conversion rates of these catalysts were also determined. Table 9 shows the results.

TABLE 9

| Example | 19 | 20 | 21 | 22 | 23 | 24 |
|---|---|---|---|---|---|---|
| $SO_2$ oxidation rate (%) | 3.5 | 6.0 | 1.0 | 4.0 | 7.0 | 1.5 |

What is claimed is:

1. A catalyst for the treatment of exhaust gases containing soot and dust comprising a catalytically active constituent on a carrier in having a honeycomb or parallel plate structure, said carrier being prepared from a slurry of crystallized calcium silicate prepared by mixing silicic acid and lime and treating the mixture under pressure, said calcium silicate having the structure of xonotrite and the formula: $6CaO.6SiO_2.H_2O$.

2. The catalyst of claim 1, wherein the catalytically active constituent is selected from the group consisting of oxides and sulfates of iron, copper, vanadium and combinations thereof.

3. The catalyst of claim 1, wherein the carrier carries $V_2O_5$ together with an additional constituent selected from the group consisting of $MoO_3$, $Co_2O_3$ and $WO_3$.

4. The catalyst of claim 3, wherein the carrier's prepared by adding $ZrO_2$ in amounts such that the carrier contains from 5 to 50 wt % of $ZrO_2$.

5. The catalyst of claim 1, wherein the carrier carries $TiO_2$ of the anatase type and $V_2O_5$.

6. The catalyst of claim 1, wherein the carrier carries a composition of 2 to 5 wt % $V_2O_5$, 1 to 10 wt % of $MoO_3$, $Co_2O_3$ or $WO_3$ with the balance being $TiO_2$ or $ZrO_2$.

* * * * *